United States Patent Office 2,696,692
Patented Dec. 14, 1954

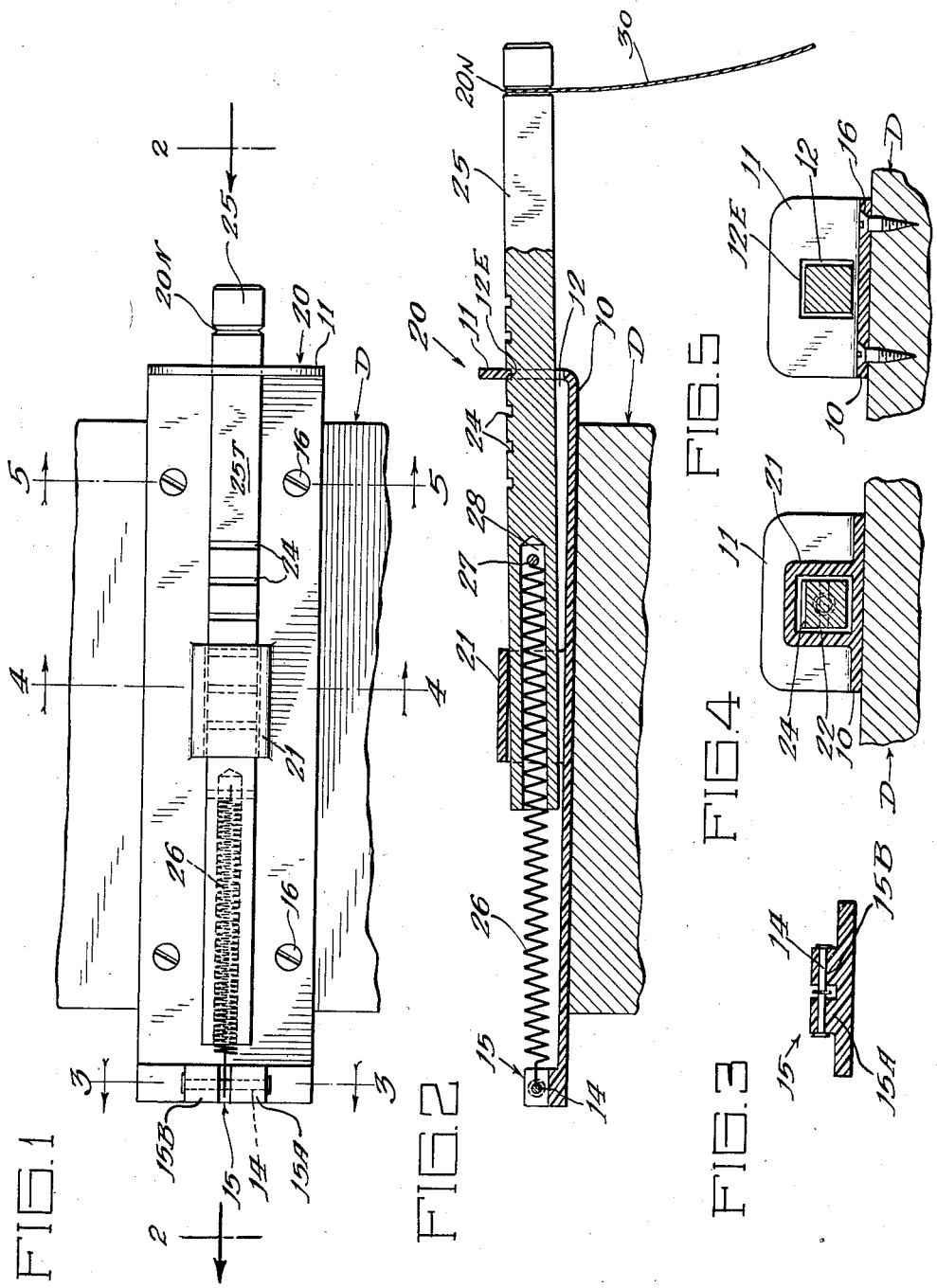

2,696,692

FISHING TACKLE

Edward A. Zielinski, Berwyn, Ill., assignor of one-half to John E. Gluszczyk, Downer's Grove, Ill.

Application July 20, 1953, Serial No. 369,005

2 Claims. (Cl. 43—15)

This invention relates to fishing tackle and in particular to fishing tackle of the kind which is to be set under spring tension, possessing such sensitivity when so set as to be tripped and thereby hook the fish when and as it strikes the bait.

Fishing tackle of the kind described above has been generally long known in the art but experience has shown that in most instances the tackle has been arranged for use only in connection with fishing rods and has not been adaptable for removable attachment in a fixed location. In addition to this, prior fishing tackle of this kind has been generally quite complicated in structure and, in fact, some of the proposals are entirely impractical, involving weak and insensitive tripping structure and cumbersome and complicated means for setting the tackle under tension. Accordingly, the object of the present invention is to devise improved fishing tackle of the foregoing kind and one that will obviate the deficiciencies set forth.

Other and further objects of the present invention will be apparent from the following description and claims and are illustrated in the accompanying drawings which, by way of illustration show a preferred embodiment of the present invention and the principle thereof and what I now consider to be the best mode in which I have contemplated applying that principle. Other embodiments of the invention embodying the same or equivalent principles may be used and structural changes may be made as desired by those skilled in the art without departing from the present invention.

In the drawings:

Fig. 1 is a plan view showing the fishing tackle of the present invention as attached to a support;

Fig. 2 is a longitudinal sectional view taken substantially on line 2—2 of Fig. 1; and Figs. 3, 4 and 5 are detail sectional views taken on the lines 3—3, 4—4 and 5—5 respectively of Fig. 1.

For purposes of disclosure, the present invention is illustrated in the drawings as embodied in fishing tackle 20 having a trip arm 25 which is shown as square in the present instance and which, in accordance with the present invention, is adapted to be placed under a predetermined amount of tension so that when the fish strikes the bait the arm 25 that is thus tensioned is released to cause the fish to be impaled on the fish hook.

Under and in accordance with the present invention, the fishing tackle 20 is adapted to be removably located in a fixed location on a dock D of the gunwale of a boat or the like, and it will then be seen that the fishing tackle 20 is complete in and of itself in that it is adapted to have a fishing line 30 connected to it in a manner to be described below. To this end, the tackle 20 includes a relatively flat base or supporting plate 10 which is of an elongated rectangular shape, and spaced countersunk openings, Fig. 5, are provided at the four corners of the base plate 10 to receive screws 16 and permit the tackle 20 to be attached to the dock D, gunwale, or the like. At one end, the plate 10 is formed with an integral upstanding ear 11 which is formed, in this instance, with a square opening 12 therein which serves as a guide and a latching means for the trip arm 25. Thus, as will be described below, the top edge 12E, Fig. 5, of the opening 12 constitutes a latch element.

The other end of the plate 10 includes an integral post 15, and this post serves to attach or anchor one end of the trip arm 25 to the plate 10 as will be described below. Preferably, the plate 10 consists of a thermosetting plastic such as Bakelite which is rigid, durable and corrosive resistant in nature.

As was noted above, the trip arm 25 is arranged on the plate 10 so that it can be set and latched with a predetermined amount of tension. Thus, the fishing line 30 is attached to the end of the trip arm 25 opposite the anchoring post 15, and in the present instance this attachment takes the form of a notch 20N, Fig. 1, cut in this end of the trip arm 25 to permit the line 30 to be tied thereto in the manner shown in Fig. 2.

Located on the top side of the plate 10, intermediate the post 15 and the ear 11, is a U-shaped portion 21 which cooperates with the top surface of the plate 10 to afford a guide, and this guide affords a square opening 22, as shown in Fig. 4, so as to loosely receive the trip arm 25. Thus, the square opening 22 in the guide is aligned with the square opening 12 in the ear 11, and the latch or tripping arm 25 is mounted for sliding movement in these two elements as thus constructed and arranged.

The trip arm 25 is so attached to the plate 10 that it can be drawn out along the length of the plate while guided by the ear 11 and U-shaped portion 21 of the guide against the return action of a coil spring 26. It is the coil spring 26 which is adapted to establish a tensioned condition for the trip arm 25 when the latter is set in its latched position, and to this end the post 15 is formed to include a pair of spaced trunnions or bearing lugs 15A and 15B which serve to support a pin 14, Fig. 3, between them. The end of the coil spring 26 corresponding to the post 15 is connected to the pin 14, and the other end of the spring 26 is of course attached to the trip arm 25. Under and in accordance with the present invention, this is accomplished by forming the trip arm 25 with an elongated socket 28 in which the coil spring 26 is mounted and attached to a pin 27 mounted transversely in the trip arm 25 at the end of the socket 28.

The end of the trip arm 25 opposite the post 15 normally extends beyond the ear 11 as shown in Fig. 1, and consequently this end of the trip arm 25 may be grasped to permit the trip arm to be withdrawn relative to the plate 10 through the guide members 11 and 21. This withdrawing action, it will be seen, occurs parallel to the longitudinal axis of the coil spring 26 so that in each and every instance of application the full strength of the coil spring 26 is developed, and the tension thus created in the coil spring is in turn applied axially to the trip arm 25 through the pin 27.

As was noted above, the top edge 12E of the opening 12 in the ear 11 serves as a latch element for the trip arm and in this connection it will be noted that the top side 25T of the trip arm corresponding to the latch element 12E is formed with a plurality of spaced apart latching teeth or notches 24 which extend parallel to one another and to the latch edge 12E as afforded by the ear 11.

The openings 12 and 22, it will be noted, are of a size to permit a slight lateral as well as vertical play of the trip arm 25 therein, and when the trip arm 25 is withdrawn outwardly as aforesaid, to tension the coil spring 26, this tensioned condition can be locked up and maintained by engaging a corresponding selected one of the notches 24 with the latch edge 12E. Thus, once the trip arm 25 has been withdrawn to an extent which is judged to place the same under sufficient tension to cause the fish to be hooked by normal operation of the tackle 20, the trip arm 25 is manually engaged with the ear 11 as afforded by the latch members 12E and 24. It will be appreciated that the latching engagement as thus established is a very sensitive one in that only a small amount of downward tug on the line 30 will open the latch and release the trip arm 25 whereupon the sharp and sudden jerk imparted to the line 30 as the trip arm 25 is pulled sharply inwardly along the plate 10 by the released coil spring 26 will cause the barb of the fish hook to impale the fish striking the bait and tensioning the line 30.

From the foregoing, it will be seen that the fishing tackle of the present invention is adaptable to different circumstances and is capable of jerking the fish line in the most direct and efficient manner. For instance, the tackle 20 may be conveniently attached in a temporary manner to the gunwale of a boat and hence trolling may be practiced as the boat is rowed. The tackle is simple and rugged in construction and the relation between the coil spring and trip arm, coupled with the manner in which these elements are associated and guided on the support plate 10, permits the full force of the spring 26 to be developed.

I claim:

1. Fishing tackle of the kind described comprising, a flat elongated plate adapted to be attached to the gunwale of a boat or the like to permit the tackle to be used for trolling or the like, an upstanding ear formed integrally at one end of the plate and having an opening therein affording a latch edge, said plate having a guide thereon between the opposite ends of the plate in alignment with the opening in said ear, a post at the other end of the plate, and an elongated trip arm slidably mounted in said guide and the opening in said ear so that one end thereof normally projects a slight distance beyond said ear in a position to be grasped, said one end of the trip arm being adapted to have a fishing line attached thereto, an elongated socket formed in the other end of the trip arm, a coil spring attached to the trip arm within said socket, the other end of the spring projecting out of said socket in which it is mounted and being attached to said post as an anchor for the spring, said arm having a row of latching notches formed therein along the side of said arm that corresponds to the latching edge of the opening in said ear whereby said trip arm may be placed under a predetermined amount of tension by manually drawing the same along said plate against the action of said spring and then engaging one of the latching notches with said latching edge.

2. Fishing tackle of the kind described comprising, a plate arranged for attachment to the gunwale of a boat or the like to permit the tackle to be used for trolling or the like, an upstanding ear at one end of the plate having a latching edge formed thereon and a guide opening therein, said plate having a guide thereon at an intermediate location between the opposite ends of the plate, said guide and the opening in said ear being aligned one with the other, an elongated trip arm slidably mounted in said guide and the opening in said ear, a spring connected between the plate and the end of the trip arm opposite said ear so that the trip arm is normally held against movement in the other direction, and a row of spaced apart latching teeth formed along one side of said trip arm whereby the trip arm may be placed under a predetermined amount of tension by manually pulling the same along said plate against the return action of said spring and then selectively engaging one of said latching teeth with said latching edge to thereby set the trip arm.

References Cited in the file of this patent

UNITED STATES PATENTS

| Number | Name | Date |
|---|---|---|
| 671,914 | Nesbit | Apr. 9, 1901 |
| 1,383,474 | Lucas | July 5, 1921 |